(12) United States Patent
Bushman

(10) Patent No.: US 9,727,264 B1
(45) Date of Patent: Aug. 8, 2017

(54) TRACKING CONTENT BLOCKS IN A SOURCE STORAGE FOR INCLUSION IN AN IMAGE BACKUP OF THE SOURCE STORAGE

(71) Applicant: STORAGECRAFT TECHNOLOGY CORPORATION, Draper, UT (US)

(72) Inventor: Nathan S. Bushman, Pleasant Grove, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 0 days.

(21) Appl. No.: 15/182,282

(22) Filed: Jun. 14, 2016

(51) Int. Cl.
*G06F 3/06* (2006.01)
*G06F 11/14* (2006.01)

(52) U.S. Cl.
CPC ............ *G06F 3/0619* (2013.01); *G06F 3/065* (2013.01); *G06F 3/067* (2013.01); *G06F 11/1451* (2013.01)

(58) Field of Classification Search
CPC ........ G06F 3/0619; G06F 3/065; G06F 3/067; G06F 3/0608; G06F 3/0614; G06F 3/0638; G06F 3/064; G06F 3/0643; G06F 3/0685; G06F 3/0688; G06F 3/0689; G06F 11/1446; G06F 11/1448; G06F 11/1451; G06F 11/1458; G06F 11/1471
See application file for complete search history.

(56) References Cited

U.S. PATENT DOCUMENTS

| | | | | |
|---|---|---|---|---|
| 7,702,870 B2 * | 4/2010 | English | ............... | H04L 67/1097 711/165 |
| 8,126,847 B1 * | 2/2012 | Zheng | ................. | G06F 11/1469 707/640 |
| 8,595,454 B1 * | 11/2013 | Nagarkar | ............ | G06F 11/1458 711/162 |
| 8,825,970 B1 * | 9/2014 | Grunwald | ............... | G06F 13/00 707/822 |
| 8,832,027 B1 * | 9/2014 | Bushman | ............ | G06F 11/1451 707/639 |
| 8,943,105 B1 * | 1/2015 | Bushman | ............ | G06F 9/45558 707/804 |
| 8,966,207 B1 * | 2/2015 | Bushman | ................ | G06F 3/061 711/165 |
| 8,972,351 B1 * | 3/2015 | Kumar | .............. | G06F 17/30088 707/639 |
| 9,317,376 B1 * | 4/2016 | Bushman | ............ | G06F 11/1466 |
| 2004/0133602 A1 * | 7/2004 | Kusters | ................... | G06F 3/061 |

(Continued)

*Primary Examiner* — Michael Krofcheck
(74) *Attorney, Agent, or Firm* — Maschoff Brennan

(57) ABSTRACT

Tracking content blocks in a source storage for inclusion in an image backup of the source storage. In one example embodiment, a method for tracking content blocks in a source storage for inclusion in an image backup of the source storage may include identifying files in a source storage for inclusion in image backups of the source storage, tracking, in an inclusion map and prior to a first snapshot time, locations in the source storage of content blocks of the identified files, tracking, in the inclusion map and prior to the first snapshot time, modifications to the locations in the source storage of the content blocks, taking a snapshot of the source storage at the first snapshot time, and backing up, subsequent to the first snapshot time, the content blocks tracked in the inclusion map from the snapshot into a full image backup.

20 Claims, 4 Drawing Sheets

(56) References Cited

U.S. PATENT DOCUMENTS

2005/0138312 A1\* 6/2005 Kubo .................. G06F 11/1466
711/162
2009/0210458 A1\* 8/2009 Glover ................ G06F 11/1451
2016/0063018 A1\* 3/2016 Das ................... G06F 17/30088
707/822

\* cited by examiner

TRACKING CONTENT BLOCKS IN A SOURCE STORAGE FOR INCLUSION IN AN IMAGE BACKUP OF THE SOURCE STORAGE

FIELD

The embodiments disclosed herein relate to tracking content blocks in a source storage for inclusion in an image backup of the source storage.

BACKGROUND

A storage is computer-readable media capable of storing data in blocks. Storages face a myriad of threats to the data they store and to their smooth and continuous operation. In order to mitigate these threats, a backup of the data in a storage may be created to represent the state of the source storage at a particular point in time and to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a destination storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the destination storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not generally need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up the content of individual files may be scattered, resulting in relatively extensive seeking.

One common problem encountered when backing up a source storage using image backup is the potential for the inclusion of unwanted files in the backups. For example, a user may desire to back up a source storage, but reduce the size of the resulting image backup by excluding particular types of files that tend to be large, such as music and movie files. However, image backup methods generally backup an entire source storage and do not generally allow individual files to be excluded from an image backup, causing content blocks of unwanted files to be needlessly retained in the image backup. Retaining content blocks of unwanted files in an image backup may increase the overall size requirements of a destination storage where the image backup is stored, increase the bandwidth overhead of transporting the image backup, and increase the processing time associated with restoring the image backup.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to tracking content blocks in a source storage for inclusion in an image backup of the source storage. The example embodiments disclosed herein may be employed to exclude content blocks of unwanted files from an image backup by identifying files in a source storage for inclusion in an image backup of the source storage, and by tracking locations of content blocks of the identified files in the source storage in an inclusion map. This tracking may occur prior to the time of a snapshot of the source storage (i.e., "pre-snapshot tracking") so that the locations of the content blocks are already stored in the inclusion map at the snapshot time, enabling the creation of an image backup of the content blocks to commence at the snapshot time and without the delay that would occur should the locations of the content blocks need to be determined subsequent to the snapshot time. The exclusion of unwanted files from an image backup in the example embodiments disclosed herein may decrease the overall size requirements of a destination storage where the image backup is stored, decrease the bandwidth overhead of transporting the image backup, and decrease the processing time associated with restoring the image backup. Further, the pre-snapshot tracking in the example embodiments disclosed herein may reduce the time between the snapshot of the source storage and the completion of the image backup of the source storage.

In one example embodiment, a method for tracking content blocks in a source storage for inclusion in an image backup of the source storage may include identifying files in a source storage for inclusion in image backups of the source storage, tracking, in an inclusion map and prior to a first snapshot time, locations in the source storage of content blocks of the identified files, tracking, in the inclusion map and prior to the first snapshot time, modifications to the locations in the source storage of the content blocks, taking a snapshot of the source storage at the first snapshot time, and backing up, subsequent to the first snapshot time, the content blocks tracked in the inclusion map from the snapshot into a full image backup.

In another example embodiment, a method for tracking content blocks in a source storage for inclusion in an image backup of the source storage may include identifying, using a file system, files in a source storage for inclusion in image backups of the source storage, tracking, in an inclusion map using the file system and prior to a first snapshot time, locations in the source storage of content blocks of the identified files, tracking, in the inclusion map using the file system and prior to a first snapshot time, modifications to the locations in the source storage of the content blocks, taking a snapshot of the source storage at the first snapshot time, backing up, subsequent to the first snapshot time, the content blocks tracked in the inclusion map from the snapshot into a full image backup.

It is to be understood that both the foregoing general description and the following detailed description are explanatory and are not restrictive of the invention as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
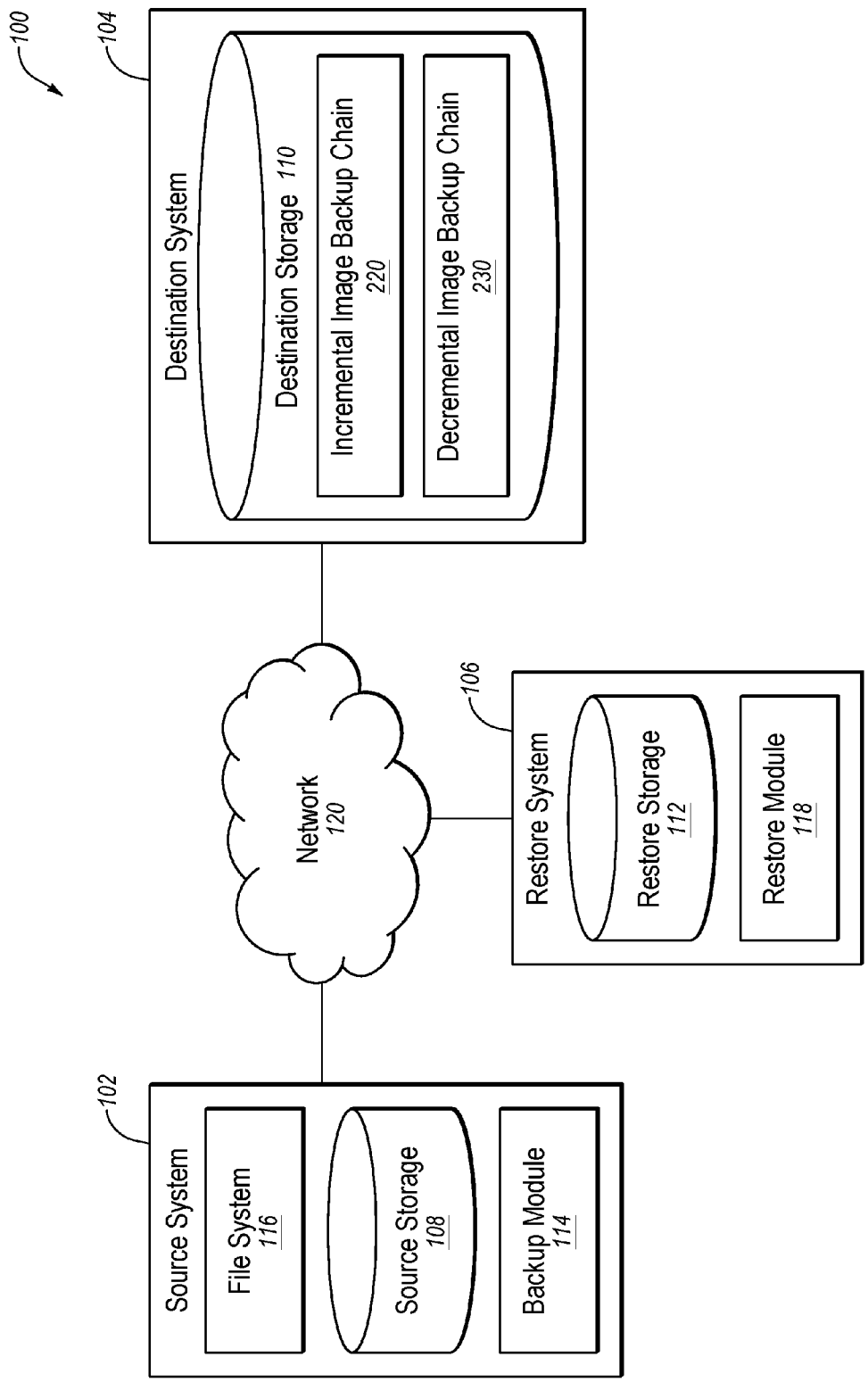
FIG. 1 is a schematic block diagram illustrating an example image backup and restore system.

The term "storage" as used herein refers to computer-readable media capable of storing data in blocks, such as one or more floppy disks, optical disks, magnetic disks, or solid state (flash) disks, or some logical portion thereof such as a volume. The term "block" as used herein refers to a fixed-length discrete sequence of bits. In some file systems, blocks are sometimes referred to as "clusters." In some example embodiments, the size of each block may be configured to match the standard sector size of a storage on which the block is stored. For example, the size of each block may be 512 bytes (4096 bits) where 512 bytes is the size of a standard sector. In other example embodiments, the size of each block may be configured to be a multiple of the standard sector size of a storage on which the block is stored. For example, the size of each block may be 4096 bytes (32,768 bits) where 512 bytes (4096 bits) is the size of a standard sector, which results in each block including eight sectors. In some file systems, a block is the allocation unit of the file system, with the allocated blocks and free blocks being tracked by the file system. The term "allocated block" as used herein refers to a block in a storage that is currently tracked as storing data, such as file content data or metadata, by a file system of the storage. The term "free block" as used herein refers to a block in a storage that is not currently tracked as storing data, such as file content data or metadata, by a file system of the storage. The term "backup" when used herein as a noun refers to a copy or copies of one or more blocks from a storage. The term "full image backup" as used herein refers to a full image backup of a storage that includes at least a copy of each unique allocated block of the storage at a point in time such that the full image backup can be restored on its own to recreate the state of the storage at the point in time, without being dependent on any other backup. A "full image backup" may also include nonunique allocated blocks and free blocks of the storage at the point in time. An example file format for a "full image backup" is the ShadowProtect Full (SPF) image backup format. The term "incremental image backup" as used herein refers to an at least partial backup of a storage that includes at least a copy of each unique allocated block of the storage that was changed between a previous point in time of a previous backup of the storage and the subsequent point in time of the incremental image backup, such that the incremental image backup, along with all previous image backups of the storage, including an initial full image backup of the storage, can be restored together as an incremental image backup chain to recreate the state of the storage at the subsequent point in time. An "incremental image backup" may also include nonunique allocated blocks and free blocks of the storage that were changed between the previous point in time and the subsequent point in time. An example file format for an "incremental image backup" is the ShadowProtect Incremental (SPI) image backup format. The term "changed block" as used herein refers to a block that was changed either because the block was previously allocated and changed or because the block was changed by being newly allocated. The term "decremental image backup" as used herein refers to an at least partial backup of a storage that includes at least a copy of each unique allocated block from a full image backup of the storage that corresponds to a block that was changed in the source storage between a previous point in time and a subsequent point in time, such that the decremental image backup, along with all subsequent image backups of the storage, including a full image backup of the storage, can be restored together as a decremental image backup chain to recreate the state of the storage at the previous point in time. A "decremental image backup" may also include nonunique allocated blocks and free blocks from a full image backup of the storage that correspond to blocks that were changed in the source storage between the point in time and the subsequent point in time. It is understood that a "full image backup," an "incremental image backup," and/or a "decremental image backup" may exclude certain undesired allocated blocks such as content blocks belonging to files whose contents are not necessary for restoration purposes, such as virtual memory pagination files and machine hibernation state files. The term "file exclusion policy" or "FEP" as used herein refers to a policy that defines which files of a storage should be excluded from a backup. It is understood that an FEP may be defined in terms of which files of a storage should be excluded from a backup, which files of a storage should be included in a backup (so that all other files can be excluded), or some combination thereof.

FIG. 1 is a schematic block diagram illustrating an example image backup and restore system 100. As disclosed in FIG. 1, the system 100 may include a source system 102, a destination system 104, and a restore system 106. The systems 102, 104, and 106 may include storages 108, 110, and 112, respectively. The source system 102 may also include a backup module 114 and a file system 116. The file system 116 may be a local file system, a network file system, a virtual file system, or other type of file system. The restore system 106 may also include a restore module 118. The systems 102, 104, and 106 may be configured to communicate with one another over a network 120.

The destination storage 110 may store one or more image backups of the source storage 108. For example, the destination storage 110 may store an incremental image backup chain 220 and/or a decremental image backup chain 230. Any of the image backups in the incremental image backup chain 220 or the decremental image backup chain 230 may be restored to the restore storage 112.

Each of the systems 102, 104, and 106 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, flash memory drives, and virtual machines running on hypervisors. The network 120 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the Internet, or some combination thereof. The network 120 may also be a network emulation of a hypervisor over which one or more virtual machines and/or physical machines may communicate.

The incremental image backup chain 220 and/or the decremental image backup chain 230 stored in the destination storage 110 may be created by the backup module 114. For example, the backup module 114 may be one or more programs that are configured, when executed, to cause one or more processors to perform image backup operations of creating a full image backup and one or more incremental image backups of the source storage 108 resulting in the incremental image backup chain 220, and/or creating a full image backup and one or more decremental image backups of the source storage 108 resulting in the decremental image backup chain 230. It is noted that these image backups may initially be created on the source system 102 and then copied to the destination system 104.

In one example embodiment, the destination system 104 may be a network server, the source system 102 may be a first desktop computer, the source storage 108 may be a volume on one or more magnetic hard drives or solid state drives of the first desktop computer, the restore system 106 may be a second desktop computer, the restore storage 112 may be a volume on one or more magnetic hard drives or solid state drives of the second desktop computer, and the network 120 may include the Internet. In this example embodiment, the first desktop computer may be configured to periodically back up the volume of the first desktop computer over the Internet to the network server as part of a backup job by creating the incremental image backup chain 220 and/or the decremental image backup chain 230 stored in the destination storage 110. The first desktop computer may also be configured to track incremental changes to its volume between backups (using the CBT map 250 discussed below in connection with FIG. 2, for example) in order to easily and quickly identify only those blocks that were changed for use in the creation of an incremental image backup or a decremental image backup. A file system (and/or one or more modules) of the first desktop computer may also be configured to perform pre-snapshot tracking of locations of content blocks of files identified for inclusion in image backups of the volume (using the inclusion maps 206 and/or 216 discussed below in connection with FIG. 2, for example), thus enabling the creation of an incremental image backup or a decremental image backup of the content blocks to commence at the snapshot time and without the delay that would occur should the locations of the content blocks need to be determined subsequent to the snapshot time. The second desktop computer may also be configured to restore one or more of the image backups from the network server over the Internet to the volume of the second desktop computer if the first desktop computer experiences corruption of its volume or if the first desktop computer's volume becomes unavailable.

Although only a single storage is disclosed in each of the systems 102, 104, and 106 in FIG. 1, it is understood that any of the systems 102, 104, and 106 may instead include two or more storages. Further, although the systems 102, 104, and 106 are disclosed in FIG. 1 as communicating over the network 120, it is understood that the systems 102, 104, and 106 may instead communicate directly with each other. For example, in some embodiments any combination of the systems 102, 104, and 106 may be combined into a single system, including embodiments where the source storage 108 represents the same storage as the restore storage 112. Further, although the backup module 114 and the restore module 118 are the only modules disclosed in the system 100 of FIG. 1, it is understood that the functionality of the modules 114 and 118 may be replaced or augmented by one or more similar modules residing on any of the systems 102, 104, or 106 or another system. Also, although the file system 116 is the only file system disclosed in the system 100 of FIG. 1, it is understood that the systems 104 and 106 may also include a file system. Finally, although only a single source storage and a single restore storage are disclosed in the system 100 of FIG. 1, it is understood that the destination system 104 of FIG. 1 may be configured to simultaneously back up multiple source storages and/or to simultaneously restore to multiple restore storages. For example, where the destination system 104 is configured as a deduplication system (that is capable of removing duplicate blocks within image backups and/or is capable of removing duplicate blocks between image backups), the greater the number of storages that are backed up to the destination storage 110 of the destination system 104, the greater the likelihood for reducing redundancy and for reducing the overall number of blocks being backed up, resulting in corresponding decreases in the overall size requirements of the destination storage 110 and in the bandwidth overhead of transporting blocks to the destination storage 110.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

Figure 2:
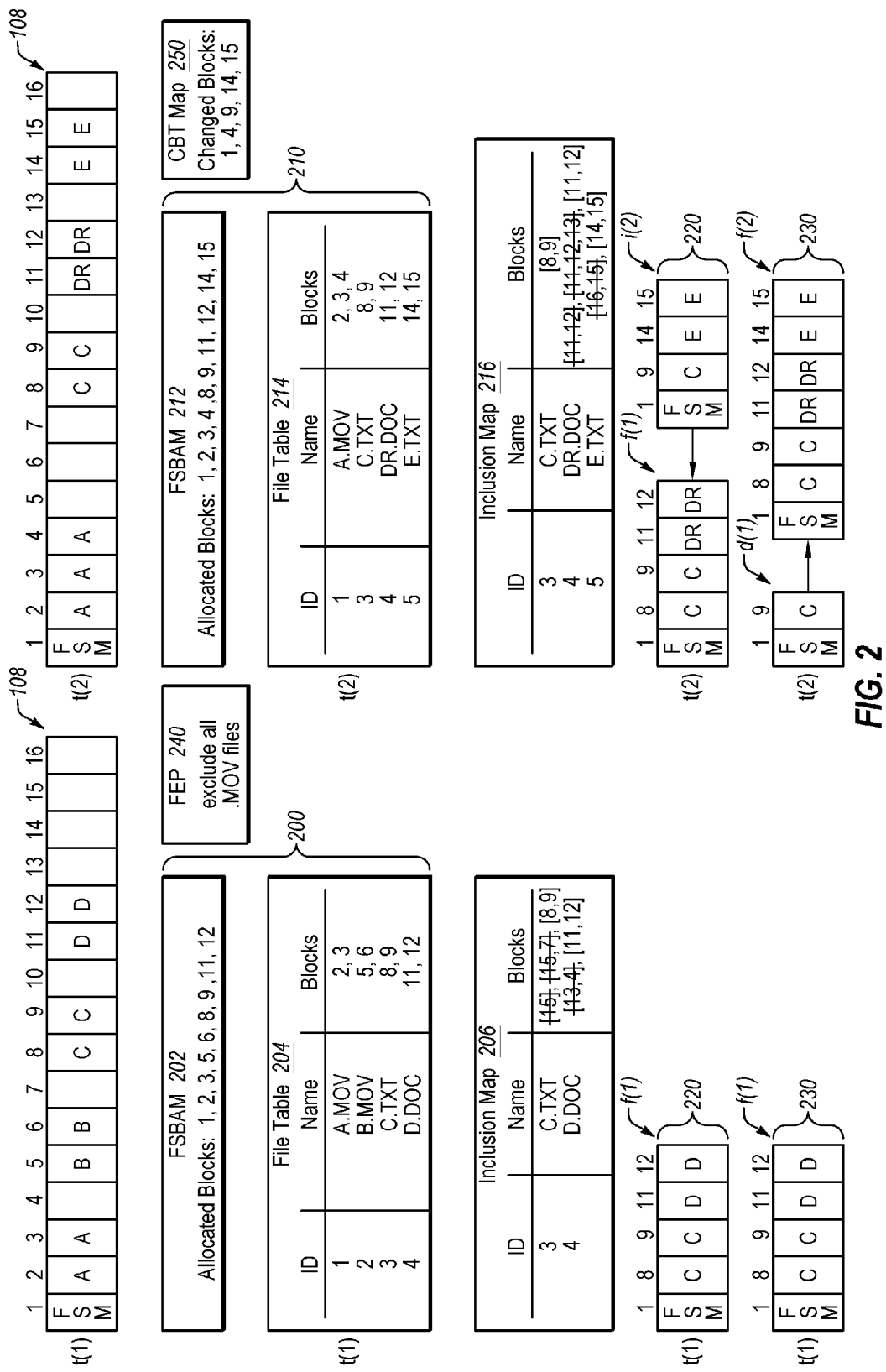
FIG. 2 is a schematic block diagram illustrating an example source storage, example file system metadata, example inclusion maps, an example file exclusion policy, an example change block tracking map, and example image backup chains.

FIG. 2 is a schematic block diagram illustrating the example source storage 108, example file system metadata (FSM) 200 and FSM 210, example inclusion maps 206 and 216, the example FEP 240, the example CBT map 250, and the example incremental image backup chain 220 and the example decremental image backup chain 230.

The source storage 108 is disclosed in FIG. 2 in a first state at time t(1) and in a second state at time t(2). Times t(1) and t(2) are snapshot times when a snapshot is taken of the source storage for use in creation of the incremental image backup chain 220 or the decremental image backup chain

230. Although the source storage 108 is depicted with sixteen blocks in FIG. 2, it is understood that the source storage 108 may include millions or billions of blocks, or potentially even more blocks. The blocks in FIG. 2 having a label therein represent blocks that are allocated at the time indicated, while the blank blocks represent blocks that are free at the time indicated. The labels in the blocks of FIG. 2 include a letter to identify the block as corresponding to file content of a particular file. For example, the label "A" in various blocks in FIG. 2 identifies the blocks as corresponding to file content of a file named "A.MOV."

As disclosed in FIG. 2, at time t(1) the source storage 108 includes the FSM 200 in block (1), and at time t(2) the source storage 108 includes the FSM 210 in block (1). The FSM 200 includes a file system block allocation map (FSBAM) 202 and a file table 204. Similarly, the FSM 210 includes an FSBAM 212 and a file table 214. The changes between the first state at time t(1) and the second state at time t(2) of the source storage 108 are reflected in the differences between the FSM 200 and the FSM 210, as well as the changed blocks indicated in the CBT map 250.

The CBT map 250 may be implemented, for example, as a bitmap where each bit corresponds to a block in the source storage 108, with the bit being set to "1" to represent a changed block and the bit being set to "0" to represent an unchanged block, or vice versa. Alternatively, the CBT map 250 may be implemented as any other data structure capable of representing changed blocks and/or unchanged blocks such as, for example, as a run-length encoded list of bits corresponding to the blocks in the source storage 108. At time t(1) the CBT map 250 may be initialized to indicate that no blocks in the source storage 108 are changed. Then, as writes are executed on the source storage 108, the blocks in the source storage 108 that are written to may be tracked as changed in the CBT map 250, such that all writes between time t(1) and t(2) are tracked in the CBT map 250. As disclosed in FIG. 2, the CBT map 250 indicates that blocks (1), (4), (9), (14), and (15) were changed between time t(1) and time t(2). As will be discussed in greater detail below, blocks (1) and (9) were previously allocated and changed and blocks (4), (14), and (15) were changed by being newly allocated.

The FSBAM 202 and the FSBAM 212 may be employed to track, at the time indicated, which blocks of the source storage 108 are allocated and/or which blocks of the storage are free. Similar to the CBT map 250, the FSBAM 202 and the FSBAM 212 may be implemented, for example, as bitmaps where each bit corresponds to a block in the source storage 108, with the bit being set to "1" to represent an allocated block and the bit being set to "0" to represent a free block, or vice versa. Alternatively, the FSBAM 202 and the FSBAM 212 may be implemented as any other data structure capable of representing blocks such as, for example, as a run-length encoded list of bits corresponding to the blocks in the source storage 108. As disclosed in a comparison of the FSBAM 212 to the FSBAM 202, blocks (4), (14), and (15) were changed by being newly allocated between time t(1) and time t(2).

The file table 204 and the file table 214 may be employed to track, at the time indicated, file information, such as a file ID, a file name, and file blocks for the files stored in the source storage 108. As disclosed in a comparison of the file table 214 to the file table 204, the files in the source storage 108 were changed between time t(1) and time t(2) as follows: the file with ID (1) was modified by being enlarged from having content in blocks (2) and (3) to having content in blocks (2), (3), and (4); the file with ID (4) was modified by being renamed from "D.DOC" to "DR.DOC"; and the file with ID (5) was newly created.

A file exclusion policy (FEP) 240 may be employed during creation of the incremental image backup chain 220 or the decremental image backup chain 230 to avoid backing up of unwanted file content. For example, a user may wish to only backup important file content and excludes less important file content such as music content and movie content. By avoiding the backing up of unwanted file content, the overall size requirements may decrease for the destination storage 110 of FIG. 1 where the incremental image backup chain 220 or the decremental image backup chain 230 are stored, the bandwidth overhead of transporting the incremental image backup chain 220 or the decremental image backup chain 230 over the network 120 of FIG. 1 may decrease, and/or the processing time associated with exposing in a virtual machine and/or restoring the incremental image backup chain 220 or the decremental image backup chain 230 may decrease.

For example, the FEP 240 directs the exclusion of the file content of all .MOV files, and may be employed to identify A.MOV and B.MOV in the source storage as files for which the file content should be excluded from the incremental image backup chain 220 or the decremental image backup chain 230. At the same time, the FEP 240 may be employed to identify C.TXT, D.DOC, DR.DOC (which is the modified version of file D.DOC), and E.TXT as files for which file content should be included in the incremental image backup chain 220 or the decremental image backup chain 230. This exclusion and inclusion may be accomplished at time t(1) by excluding blocks (2), (3), (5), and (6), and including blocks (8), (9), (11), and (12), in the full image backup f(1) of the incremental image backup chain 220 or of the decremental image backup chain 230. Similarly, this exclusion and inclusion may be accomplished at time t(2) by excluding block (4) and including blocks (9), (14), and (15) from the incremental image backup i(2) of the incremental image backup chain 220 or from the full image backup f(2) or the decremental image backup d(1) of the decremental image backup chain 230. However, as disclosed in FIG. 2, the copy of the FSM 200 or 210 that is stored as part of the incremental image backup chain 220 or the decremental image backup chain 230 may continue to list A.MOV and B.MOV, which may ensure file system data integrity in subsequent image backups of the incremental image backup chain 220 or of the decremental image backup chain 230, as discussed in U.S. Pat. No. 9,152,507, which is incorporated herein by reference in its entirety.

The inclusion map 206 and the inclusion map 216 may be employed to track, at the times indicated, locations in the source storage 108 of content blocks of the files which have been identified for inclusion in the image backups of the source storage 108. The inclusion map 206 and the inclusion map 216 may also be employed to track modifications to the locations in the source storage 108 of content blocks of the identified files. For example, the inclusion map 206 of FIG. 2 indicates that files C.TXT and D.DOC have been identified for inclusion in the incremental image backup chain 220 or the decremental image backup chain 230. The inclusion map 206 may also indicate that C.TXT was modified prior to time t(1) from originally including only block (15), to later including blocks (15) and (7), to finally including blocks (8) and (9). The inclusion map 206 indicates that file C.TXT includes blocks (8) and (9) at time t(1). The inclusion map 206 may further indicate that D.DOC was modified prior to time t(1) from originally including blocks (13) and (4) to later including blocks (11) and (12). The inclusion map 206 indicates that file D.DOC includes blocks (11) and (12) at time t(1). The content blocks and modifications to the content blocks of files C.TXT and D.DOC prior to time t(1) may be tracked by the file system 116 of FIG. 1 or by one or more modules of the source system 102 or of another system. The modification of C.TXT from including block (15) to including blocks (15) and (7) may be due to a newly-allocated content block (7) being added to file C.TXT. The modification of file C.TXT from including blocks (15) and (7) to including blocks (8) and (9) may be due to moving of the content of file C.TXT from block (15) and (7) to blocks (8) and (9) during a defragmentation of the source storage 108. Similarly, the modification of file D.DOC from including blocks (13) and (4) to including blocks (11) and (12) may be due to moving of the content of file D.DOC from blocks (13) and (4) to blocks (11) and (12) during the same defragmentation or a different defragmentation of the source storage 108.

Similarly, the inclusion map 216 of FIG. 2 indicates that files C.TXT, DR.DOC, and E.TXT have been identified for inclusion in the incremental image backup chain 220 or the decremental image backup chain 230. The inclusion map 216 indicates that file C.TXT includes blocks (8) and (9) at time t(2). The inclusion map 216 may also indicate that file DR.DOC was modified between time t(1) and t(2) from originally including blocks (11) and (12), to later including blocks (11), (12), and (13), to finally including blocks (11) and (12). The inclusion map 216 indicates that file DR.DOC includes blocks (11) and (12) at time t(2). Similarly, inclusion map 216 may further indicate that E.TXT was modified between time t(1) and t(2) from originally including blocks (16) and (15) to later including blocks (14) and (15). The inclusion map 216 indicates that file E.TXT includes blocks (14) and (15) at time t(2). The content blocks and modifications to the content blocks of files C.TXT, DR.DOC, and E.TXT between time t(1) and time t(2) may be tracked by the file system 116 of FIG. 1 or by one or more modules of the source system 102 or of another system. The modification of DR.DOC from including blocks (11) and (12) to including blocks (11), (12), and (13) may be due to a newly-allocated content block (13) being added to DR.DOC. The subsequent modification of DR.DOC from including blocks (11), (12), and (13) to including blocks (11) and (12) may be due to the deletion and freeing of content block (13) from DR.DOC. The modification of file E.TXT from including blocks (16) and (15) to including blocks (14) and (15) may be due to moving of the content of file E.TXT from blocks (16) and (15) to blocks (14) and (15) during a defragmentation of the source storage 108.

Although illustrated as tables in FIG. 2, it is understood that the inclusion maps 206 and 216 may each be implemented as a bitmap where each bit corresponds to a block in the source storage 108, with the bit being set to "1" to represent a content block identified for inclusion in image backups of the source storage 108 and the bit being set to "0" to represent a content block identified for exclusion from image backups of the source storage 108, or vice versa. Alternatively, the inclusion maps 206 and 216 may each be implemented as any other data structure capable of representing blocks for inclusion in image backups such as, for example, as a run-length encoded list of bits corresponding to the blocks in the source storage 108. In any such implementation, the blocks identified for inclusion in image backups may be listed in sequential order to further optimize the speed at which the blocks can be read from the source storage 108 during the creation of an image backup of the source storage 108. It is further understood that the inclusion maps 206 and 216 may be combined into a single image map. It is also understood that the inclusion maps 206 and 216 may further be configured to indicate FSM blocks in the source storage 108 to enable the inclusion maps 206 and 216 to include a complete list of blocks, potentially including FSM blocks, from the source storage 108 that should be backed up at the time indicated.

The tracking of content blocks of files identified for inclusion in image backups using the inclusion map 206 or the inclusion map 216 may occur prior to the time of a snapshot of the source storage 108 (i.e., "pre-snapshot tracking") so that the locations of the content blocks are already stored in the inclusion map 206 or the inclusion map 216 at the corresponding snapshot time, enabling the creation of an image backup of the content blocks to commence at the corresponding snapshot time and without the delay that would occur should the locations of the content blocks need to be determined subsequent to the snapshot time. The pre-snapshot tracking in the inclusion map 206 or the inclusion map 216 may reduce the time between the snapshot of the source storage 108 and the completion of the image backup of the source storage 108.

As disclosed in FIGS. 1 and 2, the example incremental image backup chain 220 includes a full image backup f(1) and an incremental image backup i(2), which represent the states of the source storage 108 at times t(1) and t(2), respectively, minus any excluded file content. In one example embodiment, the backup module 114 may create the full image backup f(1) and the incremental image backup i(2) of the source storage 108 and store them in the destination storage 110.

As disclosed in FIGS. 1 and 2, the full image backup f(1) may be created to preserve the state of the source storage 108 at time t(1), minus any excluded file content. This creation of the full image backup f(1) at time t(1) may include the backup module 114 copying FSM blocks of the source storage 108, as well as content blocks of files of the source storage 108 that are identified in the inclusion map 206 for inclusion in image backups, and storing the blocks in the destination storage 110. The state of the source storage 108 at time t(1) may be captured using snapshot technology in order to capture the data stored in the source storage 108 at time t(1) without interrupting other processes, thus avoiding downtime of the source storage 108. In this example, at time t(1) block (1) is an FSM block, and blocks (8), (9), (11), and (12) are content blocks listed in the inclusion map 206, and these blocks are therefore stored as part of the full image backup f(1). The full image backup f(1) may be very large depending on the size of the source storage 108 and the number of allocated blocks at time t(1). As a result, the full image backup f(1) may take a relatively long time to create and consume a relatively large amount of space in the destination storage 110. However, the size of the full image backup f(1) is reduced over a typical full image backup because it does not include blocks (2), (3), (5), and (6) due to these blocks being content blocks of files A.MOV and B.MOV, and due to content blocks of all .MOV files being excluded from the full image backup f(1) according to the policy set forth in the FEP 240.

Next, the incremental image backup i(2) may be created to capture the state at time t(2), minus any excluded file content. This may include the backup module 114 at time t(2) copying only changed FSM blocks of the source storage 108, as well as changed content blocks of files of the source storage 108 that are identified in the inclusion map 206 for inclusion in image backups, and storing the changed blocks in the destination storage 110. The state of the source storage 108 at time t(2) may also be captured using a snapshot, thus avoiding downtime of the source storage 108. In this example, blocks (9), (14), and (15) are changed in the source storage 108 between time t(1) and time t(2), as indicated in the CBT map 250, and are also listed in the inclusion map 216, and these blocks are therefore stored as part of the incremental image backup i(2). In general, as compared to the full image backup f(1), the incremental image backup i(2) may take a relatively short time to create and consume a relatively small storage space in the destination storage 110. The storage space is further reduced over a typical incremental image backup because the incremental image backup i(2) does not include block (4) due to block (4) being a content block of file A.MOV, and due to content blocks of all .MOV files being excluded from the incremental image backup i(2) according to the policy set forth in the FEP 240.

Further, additional incremental image backups may be created in the incremental image backup chain 220 on an ongoing basis. The frequency of creating new incremental image backups in the incremental image backup chain 220 may be altered as desired in order to adjust the amount of data that will be lost should the source storage 108 experience corruption of its stored blocks or become unavailable at any given point in time. The blocks from the source storage 108 can be restored to the state at the point in time of a particular incremental image backup, minus any excluded file content, by applying the image backups to the restore storage 112 from oldest to newest, namely, first applying the full image backup f(1) and then applying each successive incremental image backup up to the particular incremental image backup. For example, the data from the source storage 108 can be restored to the state at time t(2), minus any excluded file content, by applying the full image backup f(1) and then applying the incremental image backup i(2). Alternatively, the blocks from the source storage 108 can be restored to the state at the point in time of a particular incremental image backup, minus any excluded file content, by applying the image backups to the restore storage 112 concurrently, namely, concurrently applying the full image backup f(1) and each successive incremental image backup up to the particular incremental image backup. For example, the data from the source storage 108 can be restored to the state at time t(2), minus any excluded file content, accessing the full image backup f(1) and the incremental image backup i(2) concurrently, and retrieving from each backup the correct block content corresponding to time t(2). It is understood that any such restoration may further involve pruning of the FSM that is restored to the restore storage 112, as described in U.S. Pat. No. 9,152,507, which is incorporated herein by reference in its entirety.

As disclosed in FIGS. 1 and 2, the example decremental image backup chain 230 includes full image backups f(1) and f(2), which represent the states of the source storage 108 at times t(1) and t(2), respectively, minus any excluded file content. In addition, the example decremental image backup chain 230 includes decremental d(1), which represents the state of the source storage 108 at time t(1), minus any excluded file content. In one example embodiment, the backup module 114 may create the full image backups f(1) and f(2) and the decremental image backup d(1) of the source storage 108 and store them in the destination storage 110.

The full image backup f(1) in the decremental image backup chain 230 may be created to preserve the state of the source storage 108 at time t(1), minus any excluded file content, and may generally be created in a similar manner as the creation of, and include the same blocks as, the full image backup f(1) in the incremental image backup chain 220, although the format of the full image backup f(1) in the decremental image backup chain 230 may be different due to the full image backup f(1) in the decremental image backup chain 230 being formatted for use in the decremental image backup chain 230 instead of the incremental image backup chain 220. In particular, the full image backup f(1) in the decremental image backup chain 230 may have a randomly-writeable format in order to allow the full image backup f(1) in the decremental image backup chain 230 to have new blocks inserted into the full image backup f(1) at various positions, while the full image backup f(1) in the incremental image backup chain 220 may have only a sequentially-writeable format since the full image backup f(1) in the incremental image backup chain 220 may not ever need to have new blocks inserted therein at various positions.

Next, the decremental image backup d(1) may be created to preserve the state of the source storage 108 at time t(1), minus any excluded file content, while the full image backup f(1) is updated to capture the state of the source storage 108 at time t(2), minus any excluded file content, resulting in the updated full image backup f(2). This may be accomplished by the backup module 114 identifying previously allocated blocks in the source storage 108 that changed between time t(1) and time t(2), as well as blocks that were changed by being newly allocated in the source storage 108 between time t(1) and time t(2), minus any excluded file content blocks. In this example, between time t(1) and time t(2), blocks (1) and (9) were previously allocated and changed, and blocks (14) and (15) were changed by being newly allocated, as can be determined from a combination of the CBT map 250 and the full image backup f(1). The backup module 114 may then identify original blocks in the full image backup f(1) with the same positions as the previously-allocated changed blocks in the source storage 108, namely blocks (1) and (9) in the full image backup f(1), and copy these original blocks (1) and (9) from the full image backup f(1) into the decremental image backup d(1). The changed allocated blocks and newly-allocated blocks from the source storage 108, namely the changed allocated blocks (1) and (9) and newly-allocated blocks (14) and (15) of the source storage 108, are then added to the full image backup f(1), resulting in the updated full image backup f(2). As a result, the decremental image backup d(1) represents the state of the source storage 108 at time t(1), minus any excluded file content, and the updated full image backup f(2) represents the state of the source storage 108 at time t(2), minus any excluded file content. In this example, the size of the updated full image backup f(2) is reduced over a typical updated full image backup because it does not include block (4) due to block (4) being a content block of file A.MOV, and due to content blocks of all .MOV files being excluded from the incremental image backup i(2) according to the policy set forth in the FEP 240.

Further, additional decremental image backups may be created on an ongoing basis. The frequency of creating new decremental image backups may be altered as desired in order to adjust the amount of data that will be lost should the source storage 108 experience corruption of its stored data or become unavailable at any given point in time. The data from the source storage 108 can be restored to the state at the point in time of a particular decremental image backup, minus any excluded file content, by applying the image backups to a restore storage from newest to oldest, namely, first applying the full image backup and then applying each successive decremental image backup back to the particular decremental image backup. For example, the data from the source storage 108 can be restored to the state at time t(1), minus any excluded file content, after time t(2), by applying the full image backup f(2) and then applying the decremental image backup d(1). Alternatively, the data from the source storage 108 can be restored to the state at the point in time of a particular decremental image backup, minus any excluded file content, by applying the image backups to a restore storage concurrently, namely, concurrently applying the full image backup and each successive decremental image backup back to the particular decremental image backup. For example, the data from the source storage 108 may be restored to the state at time t(1), minus any excluded file content, after time t(2), by accessing the full image backup f(2) and the decremental image backup d(1) concurrently, and retrieving from each backup the correct block content corresponding to time t(1). Advantageously, the most recent backup state of the source storage 108 can be restored at any stage of the decremental image backup chain 230 by simply applying the full image backup of the decremental image backup chain 230. It is understood that any such restoration may further involve pruning of the FSM restored to the restore storage 112, as described in U.S. Pat. No. 9,152,507, which is incorporated herein by reference in its entirety.

Although only allocated blocks are included in the example incremental image backup chain 220 and in the example decremental image backup chain 230 discussed above, it is understood that in alternative implementations both allocated and free blocks may be backed up during the creation of a full image backup, an incremental image backup, or a decremental image backup. This is typically done for forensic purposes, because the contents of free blocks can be interesting where the free blocks contain data from a previous point in time when the blocks were in use and allocated. Therefore, the creation of full image backups, incremental image backups, and decremental image backups as disclosed herein is not limited to allocated blocks but may also include free blocks.

In general, as compared to the full image backup f(1), the decremental image backup d(1) may take a relatively short period of time to create and consume a relatively small storage space in the destination storage 110. However, as compared to the incremental image backups i(2), the decremental image backup d(1) may take a relatively longer period of time to create, due at least in part to the updating of the corresponding full image backup f(2) that is associated with the decremental image backup d(1). In addition to taking longer to create, the creation of the decremental image backup d(1) may also be more resource intensive than the creation of the incremental image backup i(2). Further, the creation of the decremental image backup d(1) may require exclusive access to the corresponding full image backup f(2), while the creation of the incremental image backup i(2) may be accomplished without exclusive access to the full image backup f(1). Due at least in part to the relative advantages and disadvantages of incremental image backups versus decremental image backups, the example methods disclosed herein may be employed with either or both of incremental image backup chains and decremental image backup chains.

Figure 3A:
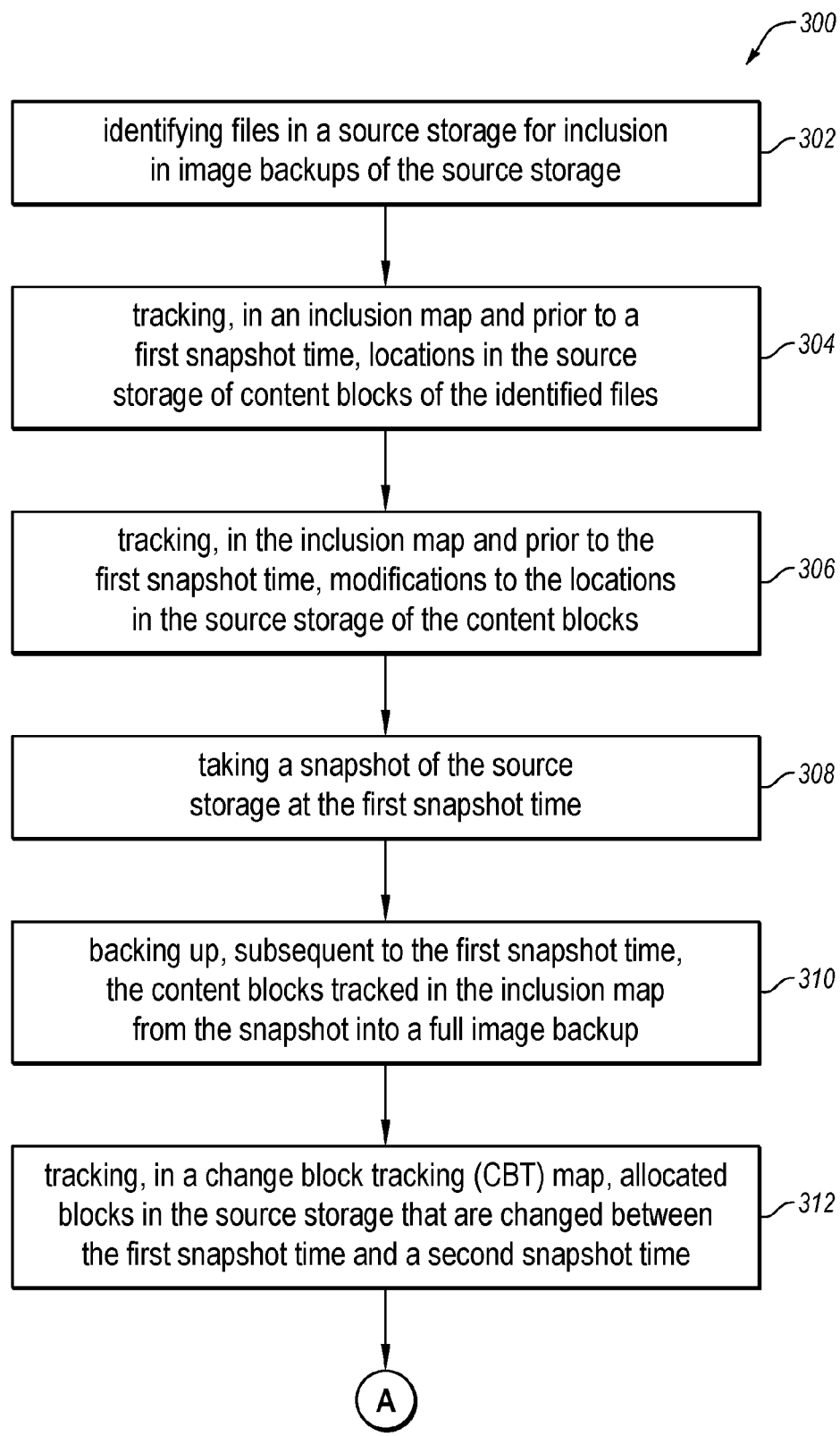
FIGS. 3A and 3B are a schematic flowchart illustrating an example method for tracking content blocks in a source storage for inclusion in an image backup of the source storage.
Figure 3B:
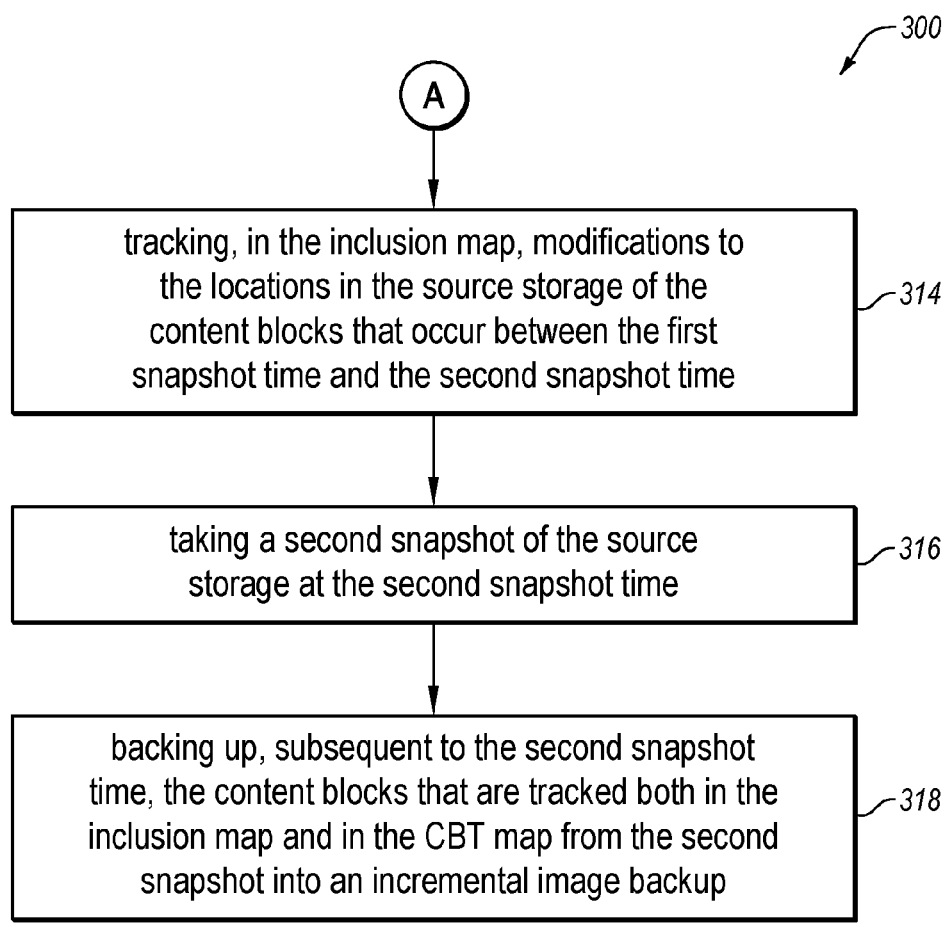

FIGS. 3A and 3B is a schematic flowchart illustrating an example method 300 for tracking content blocks in a source storage for inclusion in an image backup of the source storage for cataloging file system-level changes to a source storage between image backups of the source storage. The method 300 may be implemented, in at least some embodiments, by one or more of the backup module 114, the file system 116, and the restore module 118 of FIG. 1. For example, the backup module 114, the file system 116, and the restore module 118 may each be one or more programs, stored on one or more non-transitory computer-readable media, that are configured, when executed, to cause one or more processors to perform one or more of the steps of the method 300. Although illustrated as discrete steps, various steps may be divided into additional steps, combined into fewer steps, reordered, or eliminated, depending on the desired implementation. The method 300 will be discussed with reference to FIGS. 1, 2, 3A, and 3B.

The method 300 of FIGS. 3A and 3B may include step 302 of identifying files in a source storage for inclusion in image backups of the source storage. For example, the file system 116 of FIG. 1 may identify, prior to time t(1), at step 302, files C.TXT and D.DOC in the source storage 108 for inclusion in image backups of the source storage 108, as disclosed in FIG. 2. The identifying at step 302 may be performed according to a file inclusion policy, such as the FEP 240 of FIG. 2. Additionally or alternatively, the identifying at step 302 may be based on a user-specific list of inclusion files.

The method 300 of FIGS. 3A and 3B may include step 304 of tracking, in an inclusion map and prior to a first snapshot time, locations in the source storage of content blocks of the identified files. For example, the file system 116 of FIG. 1 may track, in the inclusion map 206 and prior to the first snapshot time t(1), at step 304, locations (8), (9), (11), and (12) in the source storage 108 as content blocks of the files C.TXT and D.DOC, which were identified at step 302, as disclosed in FIG. 2.

The method 300 of FIGS. 3A and 3B may include step 306 of tracking, in an inclusion map and prior to a first snapshot time, modifications to the locations in the source storage of the content blocks of the identified files. For example, the file system 116 of FIG. 1 may track, in the inclusion map 206 and prior to the first snapshot time t(1), at step 306, the modifications from the location (15), to locations (15) and (7), and to locations (8) and (9) of the content blocks of the file C.TXT, and the modifications from the locations (13) and (14) to the locations (11) and (12) of the content blocks of the file D.DOC, as disclosed in FIG. 2. The tracking at step 306 may be due to moving of the content blocks during a defragmentation of the source storage and/or due to newly-allocated content blocks being added to the identified files, as disclosed in FIG. 2.

The method 300 of FIGS. 3A and 3B may include step 308 of taking a snapshot of the source storage at the first snapshot time. For example, the file system 116 or the backup module 114 of FIG. 1 may take, at step 308, a snapshot of the source storage 108 at the first snapshot time t(1), as disclosed in FIG. 2.

The method 300 of FIGS. 3A and 3B may include step 310 of backing up, subsequent to the first snapshot time, the content blocks tracked in the inclusion map from the snapshot into a full image backup. For example, the backup module 114 of FIG. 1 may back up, subsequent to the first snapshot time t(1), at step 310, the content blocks (8), (9), (11), and (12) tracked in the inclusion map 206 from the snapshot into the full image backup f(1) of the incremental image backup chain 220 or of the decremental image backup chain 230. In at least some example embodiments, the tracking at steps 304 and 306 prior to the time of the snapshot at time t(1) of the source storage 108 (i.e., "pre-snapshot tracking") so that the locations of the content blocks (8), (9), (11), and (12) are already stored in the inclusion map 206 at the snapshot time t(1) enables the creation of the full image backup f(1) of the content blocks (8), (9), (11), and (12) to commence at the snapshot time t(1) and without the delay that would occur should the locations of the content blocks (8), (9), (11), and (12) need to be determined subsequent to the snapshot time t(1). The exclusion of unwanted files from the full image backup f(1) in this example may decrease the overall size requirements of the destination storage 110 where the full image backup f(1) is stored, decrease the bandwidth overhead of transporting the full image backup f(1), and decrease the processing time associated with restoring the full image backup f(1). Further, the pre-snapshot tracking in this example may reduce the time between the snapshot of the source storage 108 at snapshot time t(1) and the completion of the full image backup f(1) of the source storage.

The method 300 of FIGS. 3A and 3B may include step 312 of tracking, in a change block tracking (CBT) map, allocated blocks in the source storage that are changed between the first snapshot time and a second snapshot time. For example, the backup module 114 of FIG. 1 may track, in the CBT map 250, at step 312, allocated blocks (1), (4), (9), (14), and (15) in the source storage 108 that are changed between the first snapshot time t(1) and the second snapshot time t(2), as disclosed in FIG. 2.

The method 300 of FIGS. 3A and 3B may include step 314 of tracking, in an inclusion map, modifications to the locations in the source storage of the content blocks that occur between the first snapshot time and the second snapshot time. For example, the file system 116 of FIG. 1 may track, in the inclusion map 216, at step 314, the modifications from the locations (11) and (12), to locations (11), (12), and (13), and to locations (11) and (12) of the content blocks of the file DR. DOC, and the modifications from the locations (16) and (15) to the locations (14) and (15) of the content blocks of the file E.TXT, as disclosed in FIG. 2. The tracking at step 314 may be due to moving of the content blocks during a defragmentation of the source storage and/or due to newly-allocated content blocks being added to the identified files, as disclosed in FIG. 2.

The method 300 of FIGS. 3A and 3B may include step 316 of taking a snapshot of the source storage at the second snapshot time. For example, the file system 116 or the backup module 114 of FIG. 1 may take, at step 316, a snapshot of the source storage 108 at the second snapshot time t(2), as disclosed in FIG. 2.

The method 300 of FIGS. 3A and 3B may include step 318 of backing up, subsequent to the second snapshot time, the content blocks that are tracked both in the inclusion map and in the CBT map from the second snapshot into an incremental image backup. For example, the backup module 114 of FIG. 1 may back up, subsequent to the second snapshot time t(2), at step 316, the content blocks (9), (14), and (15) tracked in the inclusion map 216 from the second snapshot into the incremental image backup i(1) of the incremental image backup chain 220, as disclosed in FIG. 2. In at least some example embodiments, the tracking at step 314 prior to the time of the second snapshot at time t(2) of the source storage 108 (i.e., "pre-snapshot tracking") so that the locations of the content blocks (8), (9), (11), (12), (14), and (15) are already stored in the inclusion map 216 at the snapshot time t(2), enables the creation of the incremental image backup i(1) of the changed content blocks (9), (14), and (15) to commence at the snapshot time t(1) and without the delay that would occur should the locations of the changed content blocks (9), (14), and (15) need to be determined subsequent to the snapshot time t(1). The exclusion of unwanted files from the incremental image backup i(1) in this example may decrease the overall size requirements of the destination storage 110 where the incremental image backup i(1) is stored, decrease the bandwidth overhead of transporting the incremental image backup i(1), and decrease the processing time associated with restoring the incremental image backup i(1). Further, the pre-snapshot tracking in this example may reduce the time between the snapshot of the source storage 108 at snapshot time t(2) and the completion of the incremental image backup i(1) of the source storage.

It is understood that the foregoing discussion of the method 300 is but one possible implementation of a method for tracking content blocks in a source storage for inclusion in an image backup of the source storage, and various modifications are possible and contemplated. For example, the method 300 may be modified to combine the steps 304 and 306. Additionally or alternatively, the method 300 may be modified to delete the steps 312, 314, 316, and 318.

Further, the method 300 may improve the functioning of a computer itself. For example, the functioning of the source system 102 (i.e., a computing device capable of supporting a storage and communicating with other systems) itself may be improved by the method 300 at least because the backing up of the source storage 108 of the source system 102 that occurs in the method 300 may enable the restoration of the source storage 108 if, for example, the source storage 108 experiences corruption of its stored data, the source storage 108 becomes unavailable, or a user wishes to create a second identical or virtual source storage 108. Also, the method 300 may improve the technical field of backup and disaster recovery (BDR). For example, the technical field of BDR may be improved by the method 300 at least because prior art image backups of the source storage 108 did not enable pre-snapshot tracking of content blocks in the source storage 108 for inclusion in an image backup of the source storage 108, whereas the method 300 may be employed to enable such pre-snapshot tracking, thus improving the speed of an image backup operation for the end user.

The embodiments described herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method for tracking content blocks in a source storage for inclusion in an image backup of the source storage, the method comprising:
   identifying files in a source storage for inclusion in image backups of the source storage the identified files being fewer than all files in the source storage;
   tracking, in an inclusion map and prior to a first snapshot time, locations in the source storage of content blocks of the identified files;
   tracking, in the inclusion map and prior to the first snapshot time, modifications to the locations in the source storage of the content blocks;
   taking a snapshot of all content blocks of the source storage at the first snapshot time; and
   backing up, subsequent to the first snapshot time, the content blocks tracked in the inclusion map from the snapshot into a full image backup.

2. The method as recited in claim 1, wherein:
   the identifying of the files in the source storage for inclusion in image backups of the source storage is performed according to a file inclusion policy.

3. The method as recited in claim 1, wherein:
   the identifying of the files in the source storage for inclusion in image backups of the source storage is based on a user-specified list of inclusion files.

4. The method as recited in claim 1, wherein:
   the tracking, in the inclusion map and prior to the first snapshot time, of modifications to the locations in the source storage of the content blocks includes tracking, in the inclusion map and prior to the first snapshot time, modifications to the locations in the source storage of the content blocks that are due to moving of the content blocks during a defragmentation of the source storage.

5. The method as recited in claim 1, wherein:
   the tracking, in the inclusion map and prior to the first snapshot time, of modifications to the locations in the source storage of the content blocks includes tracking, in the inclusion map and prior to the first snapshot time, modifications to the locations in the source storage of the content blocks that are due to newly-allocated content blocks being added to the identified files.

6. The method as recited in claim 1, further comprising:
   tracking, in a change block tracking (CBT) map, allocated blocks in the source storage that are changed between the first snapshot time and a second snapshot time;
   tracking, in the inclusion map, modifications to the locations in the source storage of the content blocks that occur between the first snapshot time and the second snapshot time;
   taking a second snapshot of the source storage at the second snapshot time; and
   backing up, subsequent to the second snapshot time, the content blocks that are tracked both in the inclusion map and in the CBT map from the second snapshot into an incremental image backup.

7. The method as recited in claim 6, wherein:
   the tracking, in the inclusion map, of modifications to the locations in the source storage of the content blocks that occur between the first snapshot time and the second snapshot time includes tracking, in the inclusion map, modifications to the locations in the source storage of the content blocks that occur between the first snapshot time and the second snapshot time and that are due to moving of the content blocks during a defragmentation of the source storage.

8. The method as recited in claim 6, wherein:
   the tracking, in the inclusion map, of modifications to the locations in the source storage of the content blocks that occur between the first snapshot time and the second snapshot time includes tracking, in the inclusion map, modifications to the locations in the source storage of the content blocks that occur between the first snapshot time and the second snapshot time and that are due to newly-allocated content blocks being added to the identified files.

9. The method as recited in claim 6, wherein:
   the full image backup has a ShadowProtect Full (SPF) image backup format; and
   the incremental image backup has a ShadowProtect Incremental (SPI) image backup format.

10. One or more non-transitory computer-readable media storing one or more programs that are configured, when executed, to cause one or more processors to perform the method as recited in claim 1.

11. A method for tracking content blocks in a source storage for inclusion in an image backup of the source storage, the method comprising:
    identifying, using a file system, files in a source storage for inclusion in image backups of the source storage, the identified files being fewer than all files in the source storage;
    tracking, in an inclusion map using the file system and prior to a first snapshot time, locations in the source storage of content blocks of the identified files;
    tracking, in the inclusion map using the file system and prior to a first snapshot time, modifications to the locations in the source storage of the content blocks;
    taking a snapshot of all content blocks of the source storage at the first snapshot time; and
    backing up, subsequent to the first snapshot time, the content blocks tracked in the inclusion map from the snapshot into a full image backup.

12. The method as recited in claim 11, wherein:
    the identifying, using the file system, of the files in the source storage for inclusion in image backups of the source storage is performed according to a file inclusion policy.

13. The method as recited in claim 11, wherein:
    the identifying, using the file system, of files in the source storage for inclusion in image backups of the source storage is based on a user-specified list of inclusion files.

14. The method as recited in claim 11, wherein:
the tracking, in the inclusion map using the file system and prior to the first snapshot time, of modifications to the locations in the source storage of the content blocks includes tracking, in the inclusion map using the file system and prior to the first snapshot time, modifications to the locations in the source storage of the content blocks that are due to moving of the content blocks during a defragmentation of the source storage.

15. The method as recited in claim 11, wherein:
the tracking, in the inclusion map using the file system and prior to the first snapshot time, of modifications to the locations in the source storage of the content blocks includes tracking, in the inclusion map using the file system and prior to the first snapshot time, modifications to the locations in the source storage of the content blocks that are due to newly-allocated content blocks being added to the identified files.

16. The method as recited in claim 11, further comprising:
tracking, in a change block tracking (CBT) map, allocated blocks in the source storage that are changed between the first snapshot time and a second snapshot time;
tracking, in the inclusion map using the file system, modifications to the locations in the source storage of the content blocks that occur between the first snapshot time and the second snapshot time;
taking a second snapshot of the source storage at the second snapshot time; and
backing up, subsequent to the second snapshot time, the content blocks that are tracked both in the inclusion map and in the CBT map from the second snapshot into an incremental image backup.

17. The method as recited in claim 16, wherein:
the tracking, in the inclusion map using the file system, of modifications to the locations in the source storage of the content blocks that occur between the first snapshot time and the second snapshot time includes tracking, in the inclusion map using the file system, modifications to the locations in the source storage of the content blocks that occur between the first snapshot time and the second snapshot time and that are due to moving of the content blocks during a defragmentation of the source storage.

18. The method as recited in claim 16, wherein:
the tracking, in the inclusion map using the file system, of modifications to the locations in the source storage of the content blocks that occur between the first snapshot time and the second snapshot time includes tracking, in the inclusion map using the file system, modifications to the locations in the source storage of the content blocks that occur between the first snapshot time and the second snapshot time and that are due to newly-allocated content blocks being added to the identified files.

19. The method as recited in claim 16, wherein:
the full image backup has a ShadowProtect Full (SPF) image backup format; and
the incremental image backup has a ShadowProtect Incremental (SPI) image backup format.

20. One or more non-transitory computer-readable media storing one or more programs that are configured, when executed, to cause one or more processors to perform the method as recited in claim 11.

* * * * *